United States Patent
Suzuki (10) Patent No.: US 7,219,547 B2
(45) Date of Patent: May 22, 2007

(54) ANGULAR VELOCITY SENSOR AND ANGULAR VELOCITY DETECTOR

(75) Inventor: Takahiko Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/555,588

(22) PCT Filed: Mar. 30, 2004

(86) PCT No.: PCT/JP2004/004548

§ 371 (c)(1),
(2), (4) Date: Nov. 4, 2005

(87) PCT Pub. No.: WO2004/102118

PCT Pub. Date: Nov. 25, 2004

(65) Prior Publication Data

US 2007/0001662 A1    Jan. 4, 2007

(30) Foreign Application Priority Data

May 16, 2003    (JP)    ............................... 2003-138730

(51) Int. Cl.
*G01C 19/56* (2006.01)
*G01P 9/04* (2006.01)

(52) U.S. Cl. ................. 73/504.04; 73/504.12

(58) Field of Classification Search ............ 73/504.02, 73/504.04, 504.08, 504.11, 504.12, 504.13, 73/504.15, 510, 511

See application file for complete search history.

(56) References Cited

U.S. PATENT DOCUMENTS 3,902,374 A * 9/1975 Hoffman et al. ............ 74/5.6 D
4,192,189 A * 3/1980 Presley ..................... 73/504.03
6,173,611 B1 * 1/2001 Laughlin ................. 73/504.05
6,272,925 B1    8/2001 Watson

FOREIGN PATENT DOCUMENTS

| JP | A 05-001917 | 1/1993 |
|---|---|---|
| JP | A 07-020140 | 1/1995 |
| JP | A 07-260492 | 10/1995 |
| JP | A 09-196686 | 7/1997 |
| JP | A 10-148641 | 6/1998 |
| JP | A 10-267667 | 10/1998 |
| JP | A 2001-091264 | 4/2001 |
| JP | A 2001-174263 | 6/2001 |

* cited by examiner

*Primary Examiner*—Helen C. Kwok
(74) *Attorney, Agent, or Firm*—Oliff & Berridge, PLC (57) ABSTRACT

The present invention provides a cheap angular velocity sensor capable of detecting angular velocity with high precision by using a vibration mode which cannot be set by external vibration. The angular velocity sensor includes: a vibrator (2) formed as a solid of revolution and made of a magnetostrictive material; a supporter (3) disposed on an axis of the vibrator (2) and supporting the vibrator (2) at a position where the axis crosses the surface of the vibrator (2); an excitation coil (4) for generating a magnetic field along a radial direction around the axis as a center in the vibrator (2), thereby making the vibrator (2) vibrate in the radial direction; a detection coil (6) which is disposed apart from the vibrator (2) and detects a magnetic flux change caused by a change in the vibration of the vibrator (2) which occurs depending on angular velocity.

6 Claims, 4 Drawing Sheets

ANGULAR VELOCITY SENSOR AND ANGULAR VELOCITY DETECTOR

TECHNICAL FIELD

The present invention relates to an angular velocity sensor using a vibrator made of a magnetostrictive material and to an angular velocity detector using the angular velocity sensor.

BACKGROUND ART

To detect angular velocity, various methods are practically used conventionally. Among them, as an angular velocity sensor which has a relatively simple structure and, moreover, is cheap, there is a widely used angular velocity sensor employing a method of detecting angular velocity by detecting, by some method, a Coriolis force generated in the direction orthogonal to the vibration direction when the angular velocity is applied to the vibrator in a one-dimensional vibrational motion state. The angular velocity sensor is also called a rate gyro. In particular, the angular velocity sensor using the vibrator is generally called a vibration gyro. In the vibration gyro, in many cases, a vibrator is made by using piezoelectric ceramics and, when angular velocity is applied to the vibrator excited by applying AC voltage, a displacement which occurs in the vibrator by the Coriolis force is extracted as an electric signal by the piezoelectric effect, and angular velocity is detected.

However, the piezoelectric angular velocity sensor using the piezoelectric ceramics has the following problems. Specifically, the angular velocity sensor has to employ either the configuration of adhering a piezoelectric element to a vibrator or the configuration of using a piezoelectric element as the vibrator itself. In any of the cases employed, to drive the piezoelectric element and detect an electric signal by the piezoelectric effect, a wire has to be connected to an electrode of the piezoelectric element. As a result, external vibration is transmitted to the vibrator via the wire, and a problem occurs such that the angular velocity cannot be detected accurately.

To solve the problem, for example, in a vibration gyro (10) described in Japanese Patent Laid-open No. Hei 5-1917, as shown in FIG. 1 of the publication, a vibrator (12) is supported by supporters (22a and 22b) attached near a node point. As shown in FIG. 2 in the publication, lead wires (24a and 24b) are wound around the supporter 22b along the vibrator (12). Further, the lead wires (24a and 24b) are attached to the vibrator (12) by an elastic adhesive (26) such as silicone from the supporter (22b) to a portion near piezoelectric elements (14a, 14b). Similarly, a lead wire (24c) is partially adhered by the elastic adhesive (26) along the vibrator (12) and is wound around the supporter (22a). With the configuration, in the vibration gyro (10), the lead wires (24a to 24c) are attached to the vibrator (12) by using the elastic adhesive (26), so that the elastic adhesive (26) functions as a dumping material. Therefore, external vibration transmitted to the lead wires (24a to 24c) is damped (reduced) by the elastic adhesive (2b) and, as a result, the influence of the external vibration on vending mode vibration of the vibrator (12) is lessened.

In the vibration gyro (10), however, since the dumping characteristic changes according to the amount of the elastic adhesive (26), it is difficult to make the degree of lessening the external vibration constant (reproducibility is not excellent). Consequently, a problem exists such that it is difficult to detect the angular velocity with high precision. The elastic characteristic of the elastic adhesive (26) changes (deteriorates) due to temperature change or change with time. Therefore, the vibration gyro (10) also has a problem that it is difficult to excellently reduce leakage of vibration for long period. It is not easy to manage the elastic adhesive (26) and, moreover, workability of the elastic adhesive (26) is low. There is consequently a problem that it is also difficult to improve productivity of the vibration gyro (10).

As a method capable of more effectively reducing the influence on the vibrator of external vibration, a vibration gyro in which the vibrator is vibrated in a vibration mode which is hardly set for the vibrator by the external vibration is proposed. As a vibration gyro of this kind, for example, a gyro (gyroscope) disclosed in Japanese Patent Laid-open No. Hei 10-267667 is known. In this gyro, a ring-shaped vibration resonator (1) is suspended in magnetostatic field by a plurality of flexible supporting beams (5), and a vibration mode of vibrating the vibration resonator (1) by electromagnetic induction so that the shape can be changed from a ring shape to an oval shape or from the oval shape to the ring shape is used. Since the vibration mode is hardly set by external vibration, in the structure, even when external vibration is added, the influence on the vibration mode is extremely small. Therefore, in the gyro, also in the case where the external vibration is added, the angular velocity can be detected with high precision.

The gyro has, however, a problem that the plurality of flexible supporting beams (5) supporting the vibration resonator (1) have to be manufactured with high precision by using, for example, micromachining, so that the manufacturing cost is high.

On the other hand, in the angular velocity sensor disclosed in Japanese Patent Laid-open No. Hei 7-20140, excitation generated by a drive coil (12) is given to a vibrator (11) made of a magnetostrictive material, thereby generating vending mode vibration. When angular velocity is added to the vibrator (11) in the vibration state, the Coriolis force in the direction orthogonal to the vibration direction is generated in a leg portion of the vibrator (11). In this case, the vibration direction is slightly shifted (twisted) from the basic vibration direction by the Coriolis force. As a result, a stress acting on the leg portion changes, and magnetization caused by an inverse magnetostriction effect also changes. Consequently, in the angular velocity sensor, by detecting a change in the magnetization by detection coils (13a and 13b), the angular velocity applied to the vibrator (11) can be detected in a non-contact manner.

However, since the vibration mode used in the angular velocity sensor (the vibration mode of making the vibrator (11) vending mode vibrate) is a vibration mode which is easily influenced by external vibration, the angular velocity sensor has a problem such that it is difficult to detect the angular velocity with high precision.

As described above, conventionally, various angular velocity sensors have been developed. In the angular velocity sensors disclosed in Japanese Patent Laid-open Nos. Hei 5-1917 and Hei 7-20140, since the vibrator is easily influenced by the external vibration, a problem that it is difficult to detect the angular velocity with high precision exists. The gyro disclosed in Japanese Patent Laid-open No. Hei 10-267667 has a problem such that, although the influence of external vibration on the vibrator can be reduced, the manufacturing cost is very high.

DISCLOSURE OF THE INVENTION

The present invention has been achieved in consideration of the problems and an object of the invention is to provide a cheap angular velocity sensor and an angular velocity detector capable of detecting angular velocity with high precision by using a vibration mode which cannot be set by external vibration.

An angular velocity sensor according to the present invention includes: a vibrator formed as a solid of revolution and made of a magnetostrictive material; a supporter disposed on an axis of the vibrator and supporting the vibrator at a position where the axis crosses the surface of the vibrator; a magnetic field generator for generating a magnetic field along a radial direction around the axis as a center in the vibrator, thereby making the vibrator vibrate in the radial direction; and a detector which is disposed apart from the vibrator and detects a magnetic flux change caused by a change in the vibration of the vibrator which occurs depending on angular velocity.

Preferably, the supporter is made of a magnetic material.

The supporter may include a permanent magnet.

Preferably, an angular velocity sensor according to the invention further includes a case made of a magnetic material for housing the vibrator, the supporter, the magnetic field generator, and the detector.

A first angular velocity detector according to the invention is configured by disposing the angular velocity sensor having the above-described configuration on each of two axes which are orthogonal to each other.

A second angular velocity detector according to the invention is configured by disposing the angular velocity sensor having the above-described configuration on each of three axes which are orthogonal to each other.

As described above, in the angular velocity sensor according to the invention, the magnetic field generator generates the magnetic field along the radial direction using the axis of the vibrator as a center in the vibrator, thereby making the vibrator vibrate in the radial direction, and the detector disposed apart from the vibrator detects a magnetic flux change caused by a vibration change of the vibrator, which occurs depending on the angular velocity, thereby enabling the vibrator to be vibrated in a vibration state (vibration mode) which cannot be set in the normal state. Thus, while avoiding inhibition of the vibration of the vibrator by the supporter, even when external vibration is transmitted to the vibrator, the vibrator can be maintained in a vibrating state in the basic vibrations while hardly influenced by the external vibrations. Therefore, the angular velocity sensor can detect angular velocity with high precision also in a state where external vibration is added. Further, by employing a simple configuration of supporting the vibrator only by the supporter, the angular velocity sensor can be manufactured at sufficiently low cost.

In the angular velocity sensor according to the invention, by making the supporter of the magnetic material, the magnetic field generated by the magnetic field generator can be efficiently supplied to a portion around the axis of the vibrator. Therefore, the vibrator can be vibrated efficiently with low energy.

In the angular velocity sensor according to the invention, the supporter is formed by including a permanent magnet. Consequently, with the simple configuration, the combined magnetic field obtained by adding the DC magnetic field (bias magnetic field) to the alternating magnetic field can be easily generated in the vibrator. Therefore, a desired magnetic field can be easily generated in each of various vibrators made of different magnetostrictive materials, so that the vibrator can be efficiently vibrated in a region in which a magnetostriction change is large and linearity is excellent. As compared with the configuration of generating the combined magnetic field by superimposing DC voltage with alternating voltage, the excitation power can be reduced only by the amount of the DC voltage.

In the angular velocity sensor according to the present invention, by housing the vibrator, the supporter, the magnetic field generator, and the detector in the case made of a magnetic material, leakage of the magnetic field generated by the magnetic field generator to the outside of the case can be prevented, and the influence of the external magnetic field onto the vibrator and the detector can be reduced by suppressing invasion of the external magnetic fields to the inside of the case. Since the case configures a closed magnetic path for the magnetic field generated by the magnetic field generator together with the vibrator and the supporter, leakage magnetic flux can be reduced and, as a result, the vibrator can be vibrated more efficiently.

In an angular velocity detector according to the present invention, by disposing the angular velocity sensor on each of two or three axes which are orthogonal to each other, even in a state where external vibration is applied, the angular velocity in the directions of the two or three axes can be detected with high precision.

BEST MODE FOR CARRYING OUT THE INVENTION

Preferred embodiments of an angular velocity sensor and an angular velocity detector according to the present invention will be described hereinbelow by referring to the attached drawings.

First, the configuration of an angular velocity sensor according to the invention will be described with reference to the drawings.

Figure 1:
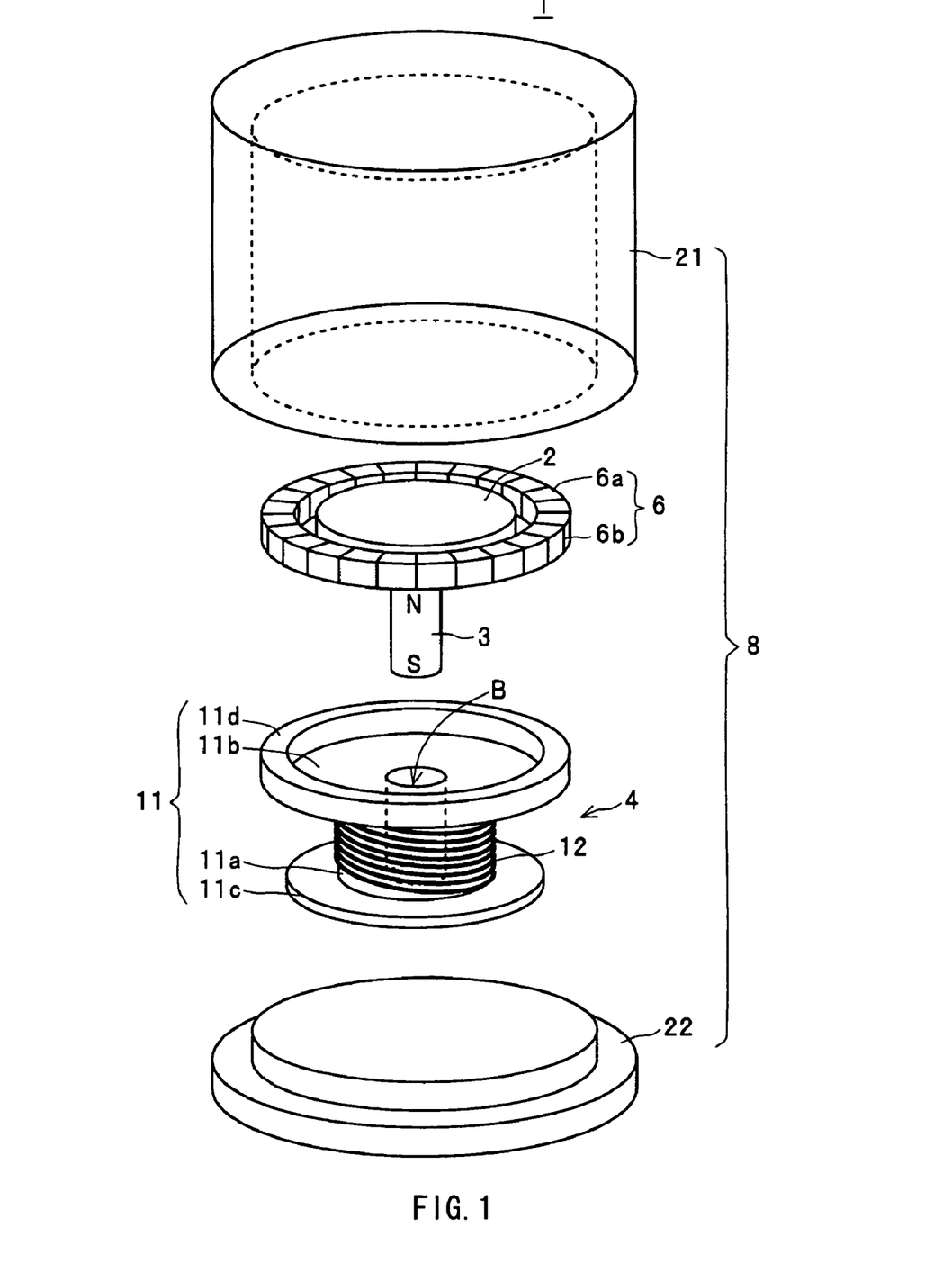
FIG. 1 is an exploded perspective view of an angular velocity sensor according to an embodiment of the present invention.
Figure 2:
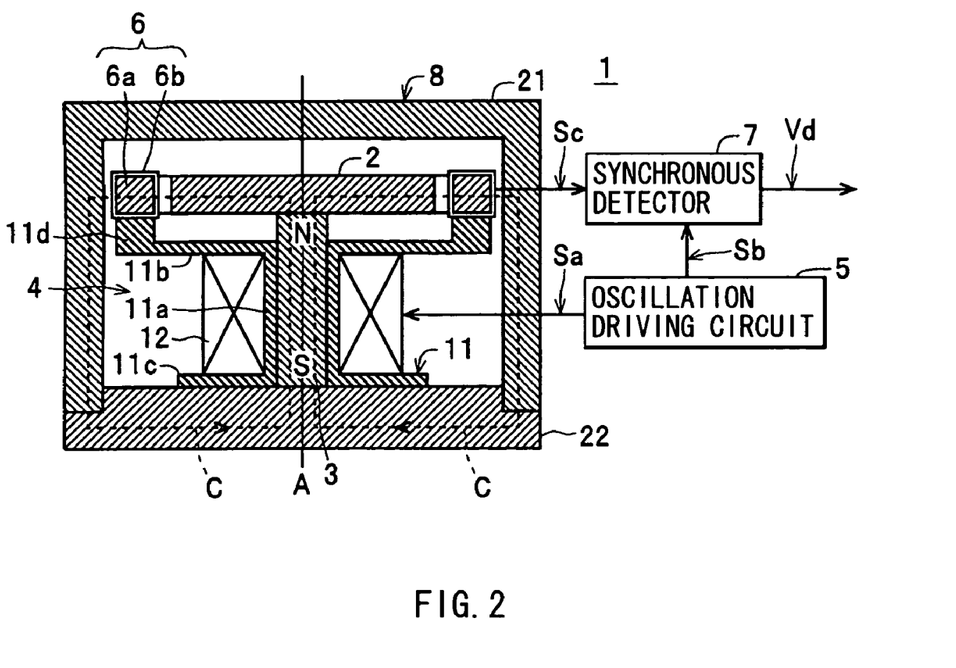
FIG. 2 is an explanatory diagram illustrating an internal structure of the angular velocity sensor, an oscillation driving circuit, and a synchronous detector.

An angular velocity sensor 1 has, as shown in FIGS. 1 and 2, a vibrator 2, a supporter 3, an excitation coil 4 as magnetic field generating means, an oscillation driving circuit 5, a detection coil 6 as detecting means, a synchronous detector 7, and a case 8. In the embodiment, as an example, the vibrator 2 is formed in a rotator shape (as an example, a flat disc member) by using a magnetostrictive material having a positive magnetostriction characteristic which extends irrespective of the direction of a magnetic field applied. It is assumed that the rotator in the embodiment is a solid figure formed by rotating a plane figure in a plane around the axis (axis A which will be described later) disposed in the same plane as a center. As the magnetostrictive material, a material having a positive or negative magnetostriction characteristic, concretely, an Ni—Fe-base magnetostrictive material, an RFe-base magnetostrictive material, or the like can be used. As the magnetostrictive material, an isotropic magnetostrictive material whose direction indicative of the magnetostriction effect is random may be used. To increase the efficiency of vibration in the vibrator 2, it is preferable to use an anisotropic magnetostrictive material whose direction is aligned with that of a magnetic field applied.

As an example, the supporter 3 is made of a permanent magnet formed in a cylindrical shape as shown in FIG. 1. As shown in FIG. 2, the supporter 3 is disposed so that its magnetic poles are positioned on the axis A of the vibrator 2, and one end side (the upper end side (N pole) in the diagram) is fixed to a portion where the axis A passes in the surface of the vibrator 2, that is, in a center portion of the under face of the vibrator 2 in the embodiment to thereby support the vibrator 2. In this case, the supporter 3 made of a permanent magnetic always generates a magnetic field having constant intensity in the direction from one end side (N pole) to the other end side (S pole). Therefore, to the vibrator 2 in which the upper end side (N pole) of the supporter 3 is fixed to the center portion of the under face, the magnetic field (bias magnetic field) having constant intensity and extending radially from the center portion toward the outer periphery is always applied from the supporter 3. The magnetic force of the supporter 3 is preset so that the vibrator 2 can be biased by the magnetic field of the supporter 3 in a drive region having excellent linearity. The center portion of the under face of the vibrator 2 functions as a center point (fixed point) of vibration by the vibrator 2. The fixed point has the property that even when the angular velocity applied to the angular velocity sensor 1 or the direction of acceleration changes, the function as the center of vibration does not change. Therefore, without being influenced by vibration applied from the outside, accurate angular velocity detection can be performed in a wide angular velocity area.

As shown in FIGS. 1 and 2, the excitation coil 4 includes a bobbin 11 made of a synthetic resin and a coil 12 formed by being wound around the bobbin 11. In this case, the button 11 includes a cylindrical former 11a, a pair of flanges 11b and 11c formed at ends of the former 11a, and a rib 11d. The bobbin 11 has the function of indirectly supporting the vibrator 2 via the supporter 3 and directly supporting the detection coil 6. Concretely, the former 11a is configured so that the supporter 3 can be inserted from the flange 11b side to a center hole B in the former 11a and the inserted supporter 3 can be held by the inner surface of the former 11a. As shown in FIG. 2, the former 11a is configured so that its overall length is shorter than the supporter 3 and the vibrator 2 attached to the bobbin 11 and the flange 11b are apart from each other (not in contact with each other). The rib 11d is formed in a ring shape as an example in the outer peripheral portion of the surface facing the vibrator 2 in the flange 11b so as to be able to support the detection coil 6. As shown in the diagram, the rib 11d is formed so that its inside diameter is larger than the outside diameter of the vibrator 2 and so as not to be in contact with the vibrator 2. With the configuration, the excitation coil 4 is disposed on one of the sides (the lower side in FIGS. 1 and 2) of the vibrator 2 so that its axis coincides with the axis A of the vibrator 2. By applying a magnetic field generated by the coil 12 on the basis of a drive signal Sa supplied from the oscillation driving circuit 5 to the vibrator 2 via the supporter 3, the vibrator 2 is allowed to vibrate. In this case, the magnetic field generated by the coil 12 is alternating magnetic field whose intensity is set to be lower than that of the bias magnetic field generated by the supporter 3.

As shown in FIG. 2, the oscillation driving circuit 5 generates the drive signal Sa and a reference signal Sb synchronized with the drive signal Sa, supplies the drive signal Sa to the coil 12 of the excitation coil 4, and supplies the reference signal Sb to the synchronous detector 7. As an example, the oscillation driving circuit 5 generates AC voltage as the drive signal Sa.

The detection coil 6 has, as an example, a toroidal core 6a having a diameter which is almost the same as that of the rib 11d (larger than that of the vibrator 2) and a coil 6b wound around the toroidal core 6a. The axis of the detection coil 6 is coaxial with the axis A of the vibrator 2. The detection coil 6 is disposed around the vibrator 2 with space from the vibrator 2 so as to be able to detect a change in the magnetic field generated around the outer peripheral surface of the vibrator 2. The synchronous detector 7 synchronous-detects a signal Sc induced at both ends of the coil 6b by the change in the magnetic field generated around the outer peripheral surface of the vibrator 2 by using the reference signal Sb and outputs a DC detection voltage Vd having a voltage value according to the voltage value of the signal Sc and having the polarity (positive or negative) according the phase of the signal Sc.

The case 8 has, as shown in FIGS. 1 and 2, an upper case 21 and a lower case 22 each made of a magnetic material. In this case, the upper case 21 is formed in a cylindrical body whose one end (upper end in the diagrams) is closed and the lower end is opened. The inside diameter of the upper case 21 is slightly larger than the outside diameter of each of the excitation coil 4 and the detection coil 6 so that those members can be housed in the upper case 21. On the other hand, the lower case 22 is formed as a disc member capable of closing the open side (lower end side in the diagram) of the upper case 21, and functions as a cover for the upper case 21 and a stand on which the supporter 3 for fixing the vibrator 2 and the vibrator 2 are placed. As an example, the lower case 22 is formed as a disc member with a step which can be fit in the upper case 21, and whose center portion in the face on the upper case 21 side is formed in a cylindrical shape which can be fit in the upper case 21. With the configuration, in a state where the open side of the upper case 21 is closed with the lower case 22, a relative positional deviation between the upper and lower cases 21 and 22 is prevented. In the case 8 having such a configuration, the vibrator 2, supporter 3, excitation coil 4, and detection coil 6 are housed in a state where their axes coincide with the axis of the case 8. Therefore, the upper and lower cases 21 and 22 made of a magnetic material has the shield function of preventing leakage of the magnetic field generated by the excitation coil 4 to the outside of the case 8 and reducing the influence of the external magnetic field on the vibrator 2 and the detection coil 6 by suppressing invasion to the inside of the case 8 of the external magnetic field. The case 8 further has the function of forming a closed magnetic path for the magnetic field generated by the excitation coil 4 together with the vibrator 2 and the supporter 3.

The angular velocity detecting operation of the angular velocity sensor 1 will now be described with reference to the FIGS. 2 to 5.

Figure 3:
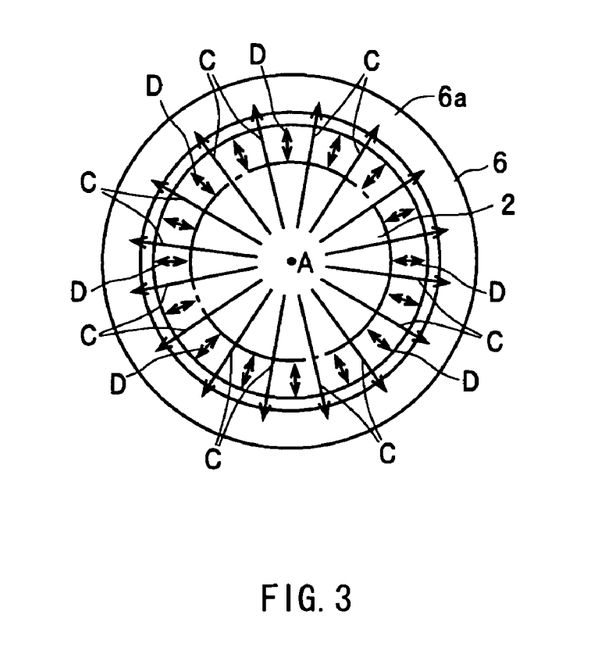
FIG. 3 is a plan view of a vibrator and a detection coil indicating the direction of a magnetic field and the vibration direction in the vibrator in a state where no angular velocity is added to the angular velocity sensor.

In a state where the drive signal Sa is supplied from the oscillation driving circuit 5 to the coil 12, the excitation coil 4 generates alternating magnetic field. The alternating magnetic field is combined to the bias magnetic field generated by the supporter 3, and a combined magnetic field C of the alternating magnetic field and the bias magnetic field is efficiently supplied to the center portion of the vibrator 2 via the supporter 3 functioning as a core member to the excitation coil 4 (as a magnetic path) as shown in FIG. 2. The combined magnetic fields C supplied to the center portion of the vibrator 2 expand radially along the radial direction from the center portion to the peripheral portion in the vibrator 2 as shown in FIG. 3, after that, go out from the peripheral surface of the vibrator 2, and pass in the radial direction through the toroidal core 6a. Further, the combined magnetic field C passes through the toroidal core 6a and is absorbed in the upper case 21. The combined magnetic field C passes through the upper case 21 and then the lower case 22 and returns to the supporter 3. In this case, since the combined magnetic field C passes radially from the center portion to the outer peripheral portion in the vibrator 2, the bias magnetic field included in the combined magnetic field C expand the diameter of the vibrator 2 as a whole, and the diameter expansion amount changes in cycles of the alternating magnetic fields included in the combined magnetic field C. That is, as shown by arrows D in FIG. 3, the vibrator 2 vibrates while repeating expansion and contraction as a whole in the all of directions radially around the axis A as a center. In other words, the vibrator 2 vibrates around the axis A as a center so that the outside diameter increases/decreases while maintaining its plane shape in a circular shape (in FIGS. 3 to 5, the increase/decrease of the outside diameter of the vibrator 2 is exaggerated, a state in which the increase amount of the outside diameter is the maximum is shown by the solid line, and a state in which the increase amount of the outside diameter is the minimum is indicated by an alternate long and short dash line). In this case, since the combined magnetic field C passes through the toroidal core 6a in the radial direction, a voltage resulted from the combined magnetic field C is not induced by the coil 6b. As a result, the detection coil 6 does not detect voltage. For easier understanding, the vibration directions (the directions indicated by the arrow D in the diagram) along the radial direction around the axis A of the vibrator 2 as a center will be also called basic vibration directions.

Figure 4:
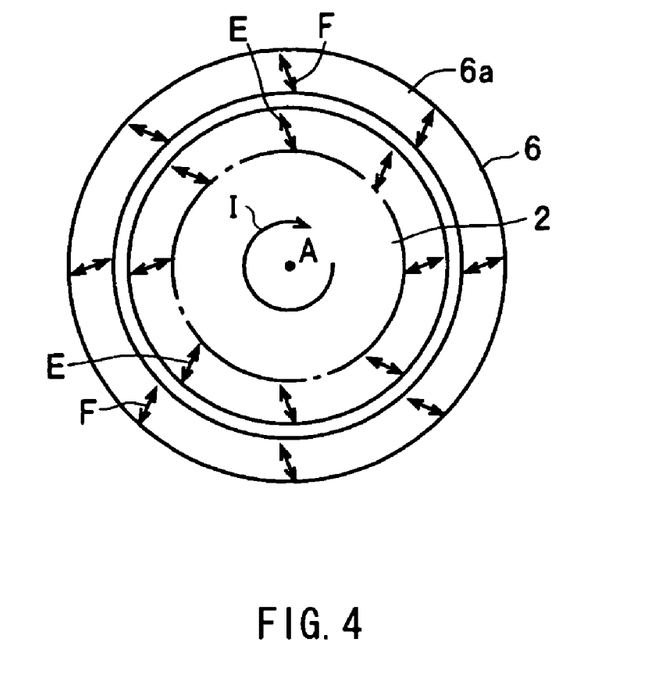
FIG. 4 is a plan view of the vibrator and the detection coil indicating the direction of a magnetic field and the vibration direction in the vibrator in a state where clockwise angular velocity is added to the angular velocity sensor.

In this state, as shown in FIG. 4, in the case where the angular velocity in the clockwise direction (the direction of the arrow I in the diagram) around the axis A as a center is applied to the angular velocity sensor 1, Coriolis force of the magnitude according to the angular velocity is generated in the direction orthogonal to the basic vibration directions D in the vibrator 2, so that the vibration direction of the vibrator 2 changes from the basic vibration directions D to the vibration direction shown by the arrow E in the diagram. In this case, the deviation amount between the basic vibration direction D and the direction of vibration shown by the arrow E changes according to the angular velocity. Therefore, the direction of the magnetic field (magnetic flux) going out from the outer peripheral surface of the vibrator 2 and going toward the detection coil 6 also changes (shifts) according to the angular velocity in the direction shown by the arrow F in the diagram (the same direction as the vibration direction E of the vibrator 2). Consequently, the magnetic flux which passes in parallel with each of the winding wires of the coil 6b in the detection coil 6 at the time of the basic vibration changes so as to cross a plane formed by each of the winding wires. As a result, the signal Sc according to the angular velocity is induced at both ends of the coil 6b. Therefore, the voltage value of the DC detection voltage Vd generated by the synchronous detector 7 also changes according to the angular velocity.

Figure 5:
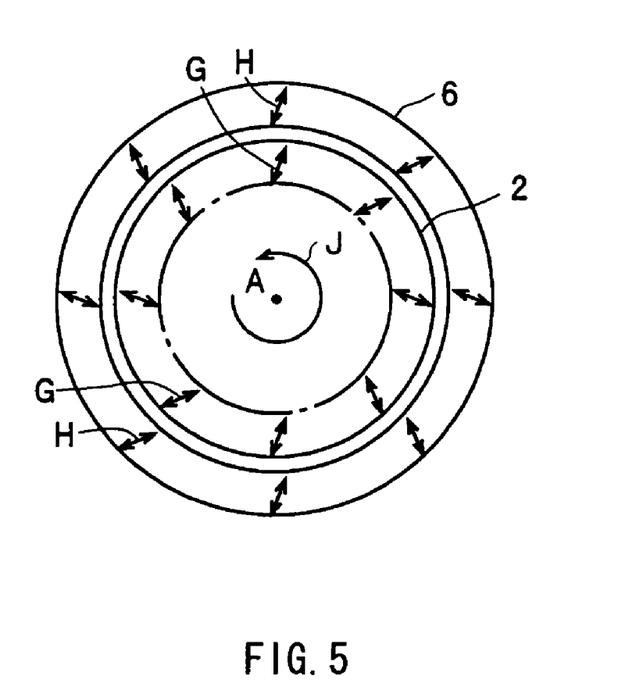
FIG. 5 is a plan view of the vibrator and the detection coil indicating the direction of a magnetic field and the vibration direction in the vibrator in a state where counterclockwise angular velocity is added to the angular velocity sensor.

On the other hand, as shown in FIG. 5, in the case where the angular velocity in the counterclockwise direction (the direction of the arrow J in the diagram) around the axis A as a center is applied to the angular velocity sensor 1, the Coriolis force according to the angular velocity is generated in the vibrator 2 in a manner similar to the above, and the vibration direction of the vibrator 2 changes from the basic vibration direction D to the vibration direction shown by the arrow G in the diagram. In this case as well, the deviation amount between the basic vibration direction D and the direction of vibration indicated by the arrow G changes according to the angular velocity. Therefore, the direction of the magnetic field (magnetic flux) going out from the outer peripheral surface of the vibrator 2 and going toward the detection coil 6 also changes (shifts) according to the angular velocity in the direction indicated by the arrow H in the diagram (the same direction as the vibration direction G in the vibrator 2). Consequently, the magnetic flux passing in parallel with each of the wires of the coil 6b in the detection coil 6 at the time of the basic vibration changes so as to cross a plane formed by the wires. As a result, the signal Sc according to the angular velocity is induced at both ends of the coil 6b. In this case, the polarity (phase) of the signal Sc becomes opposite (reverse phase) to that in the case where clockwise angular velocity is applied around the axis A as a center to the angular velocity sensor 1. Therefore, the voltage value of the DC detection voltage Vd generated by the synchronous detector 7 changes according to the angular velocity similarly except that the polarity (positive or negative) becomes opposite to that in the case where the clockwise angular velocity is applied around the axis A as a center to the angular velocity sensor 1.

Thus, by using the angular velocity sensor 1, the direction (clockwise or counterclockwise direction) of angular velocity applied to the angular velocity sensor 1 can be specified on the basis of the polarity of the DC detection voltage Vd generated by the synchronous detector 7 and, on the basis of the magnitude of the voltage value of the DC detection voltage Vd, the angular velocity can be specified.

As described above, in the angular velocity sensor 1, the vibrator 2 is supported in a state of no contact with other members including the detection coil 6 by the supporter 3 fixed to the center portion as the fixed point in expansion/contraction vibrations, and the combined magnetic field C which radially passes from the center portion to the peripheral portion of the vibrator 2 and whose strength changes periodically is generated in the vibrator 2 by the supporter 3 and the excitation coil 4 to make the vibrator 2 vibrate by making the vibrator 2 radially expand/contract as a whole in all of directions. By making the vibrator 2 vibrate in such a vibration state (vibration mode) which cannot be set in the normal state, while avoiding inhibition of the vibration of the vibrator 2 by the supporter 3, even when external vibration is transmitted to the vibrator 2, the external vibration is not transformed to the vibration mode of the vibrator 2. Consequently, without being influenced by the external vibration, the vibrator 2 can be maintained in a vibration state in the basic vibration. Therefore, the angular velocity sensor 1 can detect angular velocity with high precision also in a state where external vibration is applied.

Further, by employing a simple configuration of supporting the vibrator 2 by the supporter 3, the angular velocity sensor 1 can be manufactured at sufficiently low cost. By making the supporter 3 by a permanent magnet and always applying the bias magnetic field to the vibrator 2 and by making the supporter 3 function as the core for the excitation coil 4, the magnetic field generated by the excitation coil 4 can be supplied efficiently to the center portion in the vibrator 2 (around the axis A). Moreover, the vibrator 2 made of a magnetostrictive material is made vibrate efficiently in a region having high linearity and a large change amount. Therefore, the vibrator 2 can be efficiently vibrated with low energy (small excitation power). Further, by housing the vibrator 2, supporter 3, excitation coil 4, and detection coil 6 in the case 8 made of a magnetic material, leakage of the magnetic field generated by the excitation coil 4 to the outside of the case 8 can be prevented, and the influence of the external magnetic field onto the vibrator 2 and the detection coil 6 can be reduced by suppressing invasion of the external magnetic fields to the inside of the case 8. Since the case 8 configures a closed magnetic path for the magnetic field generated by the excitation coil 4 together with the vibrator 2 and the supporter 3, leakage magnetic flux can be reduced and, as a result, the vibrator 2 can be vibrated more efficiently.

The present invention is not limited to the foregoing embodiment. For example, the case of forming the supporter 3 by a permanent magnet and making the vibrator 2 vibrate by the combined magnetic field C by using the AC voltage as the drive signal Sa has been described in the foregoing embodiment. Alternately, the supporter 3 may be formed by a magnetic body which is not magnetized. In this case, the bias magnetic field applied to the vibrator 2 by forming the supporter 3 by a permanent magnet is generated by the excitation coil 4 by using DC voltage superimposed with the drive signal Sa. With the configuration, although the circuit configuration of the oscillation driving circuit 5 becomes slightly complicated and power (excitation power) consumed by the oscillation driving circuit 5 and the excitation coil 4 increases only by the amount corresponding to the DC voltage superimposed, in a manner similar to the foregoing embodiment, the vibrator 2 can be vibrated efficiently in the region having excellent linearity and a large change amount. Alternately, the configuration of forming the supporter 3 by a magnetic body which is not magnetized and supplying alternating voltage to which the DC voltage is not superimposed as the drive signal Sa to the excitation coil 4 can be employed. With the configuration, although the oscillation driving circuit 5 can be prevented from becoming complicated since the DC voltage is not superimposed with the drive signal Sa, since the bias magnetic field is not applied to the vibrator 2, the efficiency of vibrating the vibrator 2 deteriorates. However, the simple magnetic body can be used as the supporter 3 and the oscillation driving circuit 5 can be configured simply. Thus, the angular velocity sensor 1 can be configured simply and cheaply. Further, the vibrator 2 can be made vibrate at a frequency twice as high as that in the configuration in which a bias magnetic field is applied. Thus, the angular velocity sensor of high vibration frequency can be simply configured.

Figure 6:
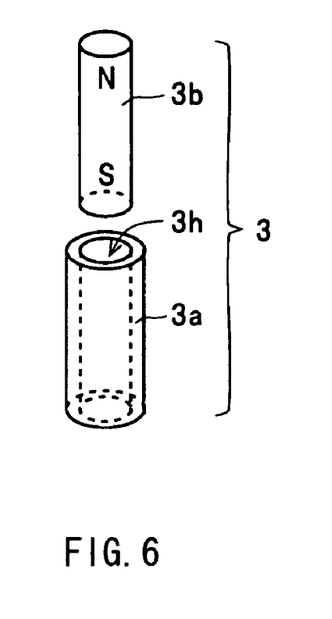
FIG. 6 is an exploded perspective view showing the configuration of a supporter including a permanent magnet.

On the other hand, the supporter 3 can be also formed by including a permanent magnet in part of it. In other words, the supporter 3 can be also formed by combining the magnetic body which is not magnetized and a permanent magnet. With the configuration, only by replacing the permanent magnet, the strength of the DC magnetic field can be easily changed. Consequently, angular velocity sensors of various characteristics can be manufactured easily. For example, as shown in FIG. 6, the supporter 3 can be also formed by inserting a metal magnet (permanent magnet) 3b having a circular column shape into a center hole 3h of a ferrite material (cylindrical magnetic body which is not magnetized) 3a having a cylindrical shape. With the configuration, by using the cylindrical ferrite material 3a as a common part and preparing the metal magnets 3b having various magnetic characteristics as the metal magnet 3b to be inserted in the center hole 3h, the characteristic of the angular velocity sensor 1 can be easily changed. Since the metal magnet 3b can be easily fit in the ferrite material 3a, the supporter 3 can be manufactured easily. When the supporter 3 is not used as a core member for the excitation coil 4, the supporter 3 can be made of a nonmagnetic material (for example, synthetic resin material). In the case where the supporter 3 is made of a nonmagnetic material, in place of the configuration of disposing the supporter 3 below the vibrator 2 to support the vibrator 2, a configuration of supporting the vibrator 2 in a suspended state by disposing the supporter 3 coaxially with the axis A between the center portion in the top face of the vibrator 2 and the case 8, fixing the upper end side to the case 8, and fixing the lower end side to the center portion in the top face of the vibrator 2 can be also employed. In this case, it is preferable to dispose the magnetic body as a core member in the former 11a of the excitation coil 4. With the configuration, in a manner similar to the foregoing embodiment, the magnetic field generated by the excitation coil 4 via the magnetic body can be efficiently supplied to the center portion of the vibrator 2. In this case, it is preferable to maintain the contact state between the magnetic body and the vibrator 2. It is not always necessary to make the magnetic body and the vibrator 2 come in contact with each other. The configuration in which a gap is interposed between the magnetic body and the vibrator 2 can be also employed. Further, a configuration of fixing supporters 3 to the top and under faces of the vibrator 2 and supporting the vibrator 2 by the pair of supporters 3 may be also employed. In this case, the supporter 3 disposed on the side opposite to the excitation coil 4 over the vibrator 2 is made of a nonmagnetic material.

Although the case where the vibrator 2 is formed as a disc member has been described in the foregoing embodiment, the shape of the vibrator 2 may be a rotator. Other than the disc member, for example, a spherical shape, a circular column shape (solid thicker than the disc member), a conical shape, a truncated cone shape, or a solid shape obtained by combining any of the shapes may be also employed. Similarly, the detection coil 6 is not limited to the ring shape but may be configured by disposing one or more circular arc members. The detection coil 6 may be also configured only by the coil 6b, that is, an air core coil. Further, in place of the detection coil, a semiconductor magnetic sensor using the Hall effect or magnetoresistive effect can be also used. The vibrator 2 can be also formed by using, in place of a positive magnetostrictive material, a negative magnetostrictive material which shrinks irrespective of the direction of a magnetic field applied.

Figure 7:
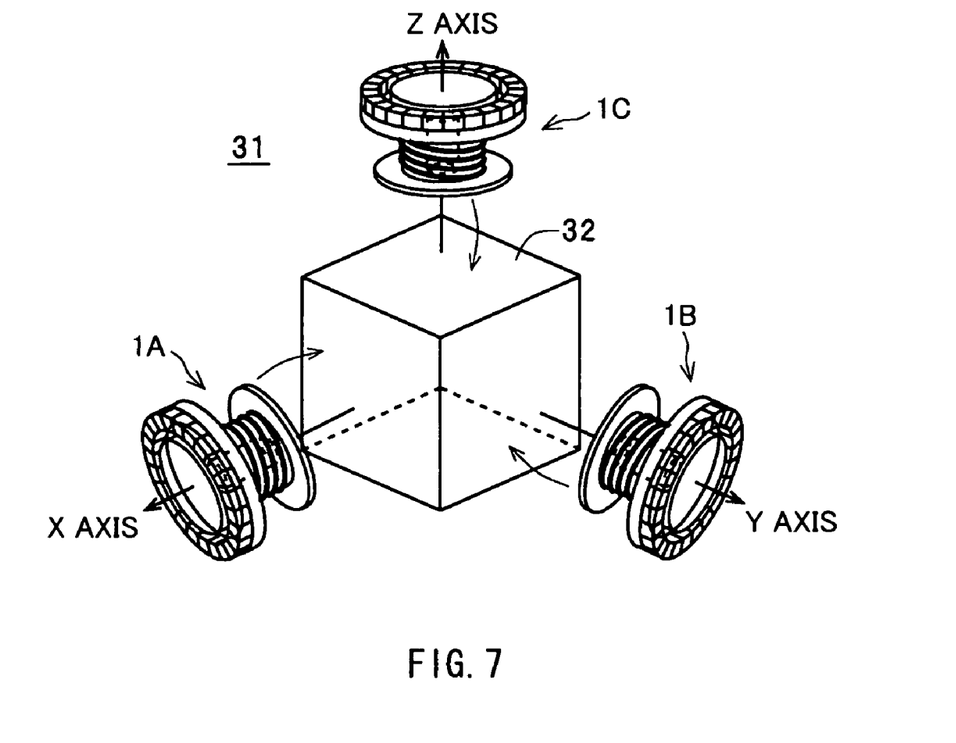
FIG. 7 is an exploded perspective view showing the configuration of an angular velocity detector using three angular velocity sensors.

The angular velocity sensor 1 can be used singly. As shown in FIG. 7, a three-axis angular velocity detector 31 can be also configured by combining three angular velocity sensors 1A, 1B, and 1C. The angular velocity detector 31 includes the three angular velocity sensors 1A, 1B, and 1C, a fixing member 32, and the oscillation driving circuits 5 and the synchronous detectors 7 (which are not shown) for the angular velocity sensors 1A, 1B, and 1C. In this case, the angular velocity sensor 1A is set so that its axis is in parallel with the X axis, the angular velocity sensor 1B is set so that its axis is in parallel with the Y axis, and the angular velocity sensor 1C is set so that its axis is in parallel with the Z axis. The angular velocity sensors 1A, 1B, and 1C are fixed to the fixing member 32. The angular velocity detector 31 can detect angular velocity in all of the three axes simultaneously. Although not shown, in the case of detecting the angular velocity added to an object which moves only in a predetermined plane, for example, a two-axis angular velocity detector can be also configured by the two angular velocity sensors 1A and 1B without using the angular velocity sensor 1C disposed in the Z axis in the diagram.

In the angular velocity sensor 1, the supporter 3 may be made of a magnetostrictive material. Obviously, the angular velocity sensor 1 and the angular velocity detector can be applied not only to a camera-shake correcting mechanism (unsteadiness correcting mechanism) employed for a video camera or the like but also to a navigation system and an attitude controller of a car, an airplane, or the like.

The invention claimed is:

1. An angular velocity sensor comprising:
   a vibrator formed as a rotator shape and made of a magnetostrictive material;
   a supporter disposed on an axis of the vibrator and supporting the vibrator at a position where the axis crosses the surface of the vibrator;
   a magnetic field generator for generating a magnetic field along a radial direction around the axis as a center in the vibrator, thereby making the vibrator vibrate in the radial direction; and
   a detector which is disposed apart from the vibrator and detects a magnetic flux change caused by a change in the vibration of the vibrator, the change in the vibration occurring depending on angular velocity.

2. An angular velocity sensor according to claim 1, wherein the supporter is made of a magnetic material.

3. An angular velocity sensor according to claim 2, wherein the supporter includes a permanent magnet.

4. An angular velocity sensor according to claim 1, further comprising a case made of a magnetic material for housing the vibrator, the supporter, the magnetic field generator, and the detector.

5. An angular velocity detector configured by disposing an angular velocity sensor on each of two axes which are orthogonal to each other,
   wherein each of the angular velocity sensors comprises:
   a vibrator formed as a rotator shape and made of a magnetostrictive material;
   a supporter disposed on an axis of the vibrator and supporting the vibrator at a position where the axis crosses the surface of the vibrator;
   a magnetic field generator for generating a magnetic field along a radial direction around the axis as a center in the vibrator, thereby making the vibrator vibrate in the radial direction; and
   a detector which is disposed apart from the vibrator and detects a magnetic flux change caused by a change in the vibration of the vibrator, the change in the vibration occurring depending on angular velocity.

6. An angular velocity detector configured by disposing an angular velocity sensor on each of three axes which are orthogonal to each other,
   wherein each of the angular velocity sensors comprises:
   a vibrator formed as a rotator shape and made of a magnetostrictive material;
   a supporter disposed on an axis of the vibrator and supporting the vibrator at a position where the axis crosses the surface of the vibrator;
   a magnetic field generator for generating a magnetic field along a radial direction around the axis as a center in the vibrator, thereby making the vibrator vibrate in the radial direction; and
   a detector which is disposed apart from the vibrator and detects a magnetic flux change caused by a change in the vibration of the vibrator, the change in the vibration occurring depending on angular velocity.

* * * * *